(12) United States Patent
Kandil et al.

(10) Patent No.: US 6,838,778 B1
(45) Date of Patent: Jan. 4, 2005

(54) INTEGRATED STARTER GENERATOR DRIVE HAVING SELECTIVE TORQUE CONVERTER AND CONSTANT SPEED TRANSMISSION FOR AIRCRAFT HAVING A CONSTANT FREQUENCY ELECTRICAL SYSTEM

(75) Inventors: Magdy A. Kandil, Rockford, IL (US); Laurence D. Vanek, Janesville, WI (US); James L. Abbot, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 89 days.

(21) Appl. No.: 10/154,942

(22) Filed: May 24, 2002

(51) Int. Cl.⁷ .......................... F02N 11/04; F02N 11/08; F02N 7/08; F02N 17/00
(52) U.S. Cl. .......................... 290/31; 290/27; 290/36 R; 290/38 R; 290/46
(58) Field of Search .............................. 290/7, 27, 28, 290/31, 36 R, 38 R, 46–48

(56) References Cited

U.S. PATENT DOCUMENTS

| | | | | |
|---|---|---|---|---|
| 3,577,002 A | * | 5/1971 | Hall et al. ..................... 290/46 |
| 3,596,105 A | | 7/1971 | Segrest ........................ 290/46 |
| 3,597,621 A | * | 8/1971 | Yamada ........................ 290/2 |
| 3,786,696 A | | 1/1974 | Aleem ......................... 74/687 |
| 3,902,073 A | | 8/1975 | Lafuze ........................ 290/46 |
| 3,937,974 A | | 2/1976 | Lafuze ........................ 290/46 |
| 3,983,693 A | | 10/1976 | Werner ....................... 60/39.14 |
| 4,093,869 A | | 6/1978 | Hoffmann et al. ............. 290/31 |
| 4,139,780 A | | 2/1979 | Hucker et al. ................ 307/86 |
| 4,217,538 A | | 8/1980 | Ziemacki ..................... 322/29 |
| 4,282,443 A | | 8/1981 | Seidl .......................... 290/1 R |
| 4,315,442 A | | 2/1982 | Cordner ....................... 74/687 |
| 4,330,743 A | * | 5/1982 | Glennon ....................... 322/10 |
| 4,353,444 A | * | 10/1982 | Bionaz ........................ 192/3.29 |
| 4,401,938 A | | 8/1983 | Cronin ........................ 322/29 |
| 4,426,585 A | * | 1/1984 | Bigalke ....................... 290/38 B |
| 4,456,830 A | | 6/1984 | Cronin ........................ 290/27 |
| 4,473,752 A | | 9/1984 | Cronin ........................ 290/38 R |
| 4,481,459 A | | 11/1984 | Mehl et al. .................... 322/10 |
| 4,576,265 A | * | 3/1986 | Kumura et al. ................ 477/95 |
| 4,587,436 A | | 5/1986 | Cronin ........................ 307/21 |
| 4,695,776 A | | 9/1987 | Dishner et al. ............... 318/14 |
| 4,697,090 A | | 9/1987 | Baker et al. .................. 290/4 R |
| 4,708,030 A | | 11/1987 | Cordner ....................... 74/686 |

(List continued on next page.)

FOREIGN PATENT DOCUMENTS

| | | |
|---|---|---|
| EP | 0 478 225 A2 | 4/1992 |
| EP | 0 789 144 A2 | 8/1997 |
| EP | 0 789 144 A3 | 8/1998 |

*Primary Examiner*—Joseph Waks
*Assistant Examiner*—Pedro J. Cuevas
(74) *Attorney, Agent, or Firm*—Carlson, Gaskey & Olds

(57) ABSTRACT

A starter-generator for an aircraft engine comprises a dynamoelectric machine alternatively operable as a motor or as a generator, having a rotor. A support motor is coupled to the dynamoelectric machine to assist the machine. A torque converter selectively couples and decouples the rotor to the engine, coupling the rotor to the engine at some point when dynamoelectric machine is operated as a motor. A constant speed transmission has an input adapted to be connected to the engine and an output to be connected to the rotor. The unit provides a desired speed relation between input and output. The engine may be started by the dynamoelectric machine when operated as a motor through a first power train including the torque converter and may drive the dynamoelectric machine as a generator through a second power train including the constant speed transmission.

19 Claims, 3 Drawing Sheets

U.S. PATENT DOCUMENTS

| | | | | |
|---|---|---|---|---|
| 4,724,331 A | * | 2/1988 | Nordlund | 290/38 R |
| 4,733,155 A | | 3/1988 | Smith | 322/10 |
| 4,743,776 A | | 5/1988 | Baehler et al. | 290/31 |
| 4,743,777 A | | 5/1988 | Shilling et al. | 290/46 |
| 4,748,337 A | | 5/1988 | Raad et al. | 290/31 |
| 4,772,802 A | | 9/1988 | Glennon et al. | 290/31 |
| 4,786,852 A | | 11/1988 | Cook | 322/10 |
| 4,803,376 A | * | 2/1989 | N'Guyen | 290/22 |
| 4,862,009 A | | 8/1989 | King | 290/22 |
| 4,888,493 A | | 12/1989 | Fluegel | 290/4 C |
| 4,922,119 A | | 5/1990 | Raad et al. | 290/31 |
| 4,967,096 A | | 10/1990 | Diemer et al. | 307/19 |
| 5,013,929 A | | 5/1991 | Dhyanchand | 290/31 |
| 5,023,537 A | | 6/1991 | Baits | 318/732 |
| 5,028,803 A | | 7/1991 | Reynolds | 290/31 |
| 5,037,353 A | * | 8/1991 | Suzuki et al. | 464/27 |
| 5,055,700 A | | 10/1991 | Dhyanchand | 290/31 |
| 5,077,485 A | | 12/1991 | Rashid | 307/84 |
| 5,087,824 A | * | 2/1992 | Nelson | 290/1 A |
| 5,097,140 A | | 3/1992 | Crall | 290/36 R |
| 5,126,582 A | * | 6/1992 | Sugiyama | 290/46 |
| 5,132,604 A | | 7/1992 | Shimane et al. | 322/10 |
| 5,141,173 A | * | 8/1992 | Lay | 244/2 |
| 5,172,543 A | * | 12/1992 | White | 60/778 |
| 5,260,642 A | | 11/1993 | Huss | 322/51 |
| 5,283,471 A | | 2/1994 | Raad | 290/46 |
| 5,296,799 A | * | 3/1994 | Davis | 322/35 |
| 5,309,029 A | | 5/1994 | Gregory et al. | 290/1 R |
| 5,352,929 A | | 10/1994 | Kohl et al. | 290/36 R |
| 5,406,189 A | | 4/1995 | Wohlberg et al. | 322/10 |
| 5,418,400 A | * | 5/1995 | Stockton | 290/46 |
| 5,477,115 A | * | 12/1995 | McClean et al. | 318/461 |
| 5,512,811 A | | 4/1996 | Latos et al. | 322/10 |
| 5,546,742 A | | 8/1996 | Shekhawat et al. | 60/39.142 |
| 5,553,454 A | * | 9/1996 | Mortner | 60/409 |
| 5,555,722 A | * | 9/1996 | Mehr-Ayin et al. | 60/788 |
| 5,558,175 A | * | 9/1996 | Sherman | 180/65.2 |
| 5,587,647 A | | 12/1996 | Bansal et al. | 322/45 |
| 5,627,744 A | | 5/1997 | Baker et al. | 363/165 |
| 5,751,070 A | * | 5/1998 | Nagao et al. | 290/46 |
| 5,880,533 A | | 3/1999 | Arai et al. | 290/31 |
| 5,927,452 A | * | 7/1999 | Freise et al. | 192/3.52 |
| 5,977,645 A | | 11/1999 | Glennon | 290/40 F |
| 5,977,648 A | | 11/1999 | Seffernick et al. | 290/43 |
| 5,979,631 A | * | 11/1999 | Lundstrom | 192/85 CA |
| 6,008,614 A | | 12/1999 | Imai | 318/700 |
| 6,014,006 A | | 1/2000 | Stuntz et al. | 318/804 |
| 6,018,233 A | | 1/2000 | Glennon | 322/22 |
| 6,037,752 A | | 3/2000 | Glennon | 322/22 |
| 6,040,634 A | * | 3/2000 | Larguier | 290/45 |
| 6,051,809 A | * | 4/2000 | Colella | 219/133 |
| 6,069,467 A | | 5/2000 | Jansen | 318/802 |
| 6,137,258 A | | 10/2000 | Jansen | 318/802 |
| 6,153,942 A | | 11/2000 | Roseman et al. | 290/47 |
| 6,163,128 A | | 12/2000 | Hiti et al. | 318/722 |
| 6,177,734 B1 | | 1/2001 | Masberg et al. | 290/31 |
| 6,232,691 B1 | | 5/2001 | Anderson | 310/179 |
| 6,318,532 B1 | * | 11/2001 | Gassmann | 192/35 |
| 6,351,090 B1 | * | 2/2002 | Boyer et al. | 318/139 |
| 6,354,974 B1 | | 3/2002 | Kozarekar | 475/5 |
| 6,364,042 B1 | * | 4/2002 | Joachim | 180/65.2 |
| 6,414,462 B2 | | 7/2002 | Chong | 318/701 |
| 6,424,065 B1 | * | 7/2002 | Vlemmings et al. | 310/89 |
| 6,433,506 B1 | | 8/2002 | Pavlov et al. | 318/804 |
| 6,481,406 B2 | * | 11/2002 | Pels | 123/179.3 |
| 6,501,190 B1 | * | 12/2002 | Seguchi et al. | 290/46 |
| 6,561,336 B1 | * | 5/2003 | Huart et al. | 192/70.25 |
| 6,633,099 B2 | * | 10/2003 | Fulton et al. | 310/75 R |
| 6,634,247 B2 | * | 10/2003 | Pels et al. | 74/329 |
| 6,663,527 B2 | * | 12/2003 | Phelan et al. | 475/107 |
| 6,664,652 B2 | * | 12/2003 | Chane-Waye | 290/38 R |
| 6,666,787 B2 | * | 12/2003 | Doepke | 475/5 |
| 6,679,213 B2 | | 1/2004 | Kurita | 123/179.3 |
| 6,683,428 B2 | | 1/2004 | Pavlov et al. | 318/432 |
| 6,698,562 B2 | * | 3/2004 | Teraoka et al. | 192/35 |
| 6,699,151 B2 | * | 3/2004 | Grogg et al. | 475/88 |
| 6,700,212 B2 | * | 3/2004 | Ackermann et al. | 290/36 R |
| 6,703,756 B2 | | 3/2004 | Reutlinger | 310/54 |
| 6,719,656 B2 | * | 4/2004 | Bowen | 475/5 |
| 6,725,989 B1 | * | 4/2004 | Krisher et al. | 192/35 |
| 6,733,411 B1 | * | 5/2004 | Kaplan et al. | 475/88 |

* cited by examiner

INTEGRATED STARTER GENERATOR DRIVE HAVING SELECTIVE TORQUE CONVERTER AND CONSTANT SPEED TRANSMISSION FOR AIRCRAFT HAVING A CONSTANT FREQUENCY ELECTRICAL SYSTEM

BACKGROUND OF THE INVENTION

This invention relates to a starter-generator for an aircraft engine, such as a turbine engine.

A turbine engine employed in an aircraft may be started by supplying compressed air to an accessory air turbine motor having reduction gearing to drive the engine. Compressed air is provided by an auxiliary power unit or bleed air from another engine. These pneumatic systems require numerous air ducts, seals and air valves that are not only bulky but heavy. Moreover, these systems add undesirable complexity to the aircraft, reducing reliability and increasing cost for aircraft operators.

Recently, aircraft manufacturers have commenced using electric starters for turbine engines. Such a starter adds little additional componentry and wiring to the aircraft because the starter takes advantage of the aircraft's existing electrical system. Thus, the starter does away with many of the components used to start the engine by compressed air.

One approach to starting a turbine engine electrically is to employ a single dynamoelectric machine that operates as both a starter and a generator. Typically, this machine comprises a rotor and stator that serve the dual function of cranking the engine to start and operating as a generator driven by the turbine engine after start. The machine supports this dual function to eliminate the need for separate machines, associated mounting pads, and gearing on the engine accessory gearbox. One such starter-generator system uses a synchronous generator to operate as an induction motor to start the turbine engine. However, the use of such a device as an induction motor to start the engine creates the risk of damaging the integrity of the device. Potential burning of rotating diodes, very high current through the damper bars and the effect of inrush currents on field windings all pose risks to the device.

A need therefore exists for a starter-generator offering the benefits of an electric start while avoiding the foregoing risks.

SUMMARY OF THE INVENTION

The present invention employs a starter-generator coupled to a support motor, which operates to drive the starter-generator up to an initial synchronous speed.

As known, the starter-generator may operate as both a motor and a generator. In contrast to existing devices, however, a support motor is coupled to the starter-generator to accelerate it to a designated synchronous speed. The support motor may also operate as another generator driven by the engine in a power generation mode.

Mechanical linkages may exist between the engine and the starter-generator to reduce the load on the engine or the load on the starter-generator. A torque converter may selectively couple and decouple the starter-generator to the engine. When the starter-generator is operated as a motor, the torque converter permits the starter-generator to rotate the turbine engine. When the starter-generator is operated as a generator, the torque converter decouples the direct connection from the engine to the starter-generator. Instead, the starter-generator receives mechanical power from a constant speed transmission receiving input from the engine and outputting a desired speed to the starter-generator to generate electricity at a constant frequency. The support motor maybe a permanent magnet generator, which may also serve to generate electricity for the aircraft.

The torque converter may decouple the starter-generator from the engine until such time that the starter-generator has reached a specific speed. Upon reaching this speed, the torque converter may then couple the engine to the starter-generator. The support motor may assist the starter-generator in reaching this predetermined speed. A control unit sensing the speed of the starter-generator and engine may serve to control the torque converter via a flow control valve.

Another mechanical linkage may operate to decouple the engine from the torque converter when the rotational speed of the turbine engine, once started, outpaces the speed of the torque converter as driven by the starter-generator. Another linkage may decouple the engine from the starter-generator when during start mode the rotational speed of the starter-generator outpaces the speed of the constant speed transmission, which is coupled to the starting engine. In addition, the support motor maybe powered by its own power supply. The starter-generator may be powered by a second power source which switches on when the starter-generator reaches a predetermined speed.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
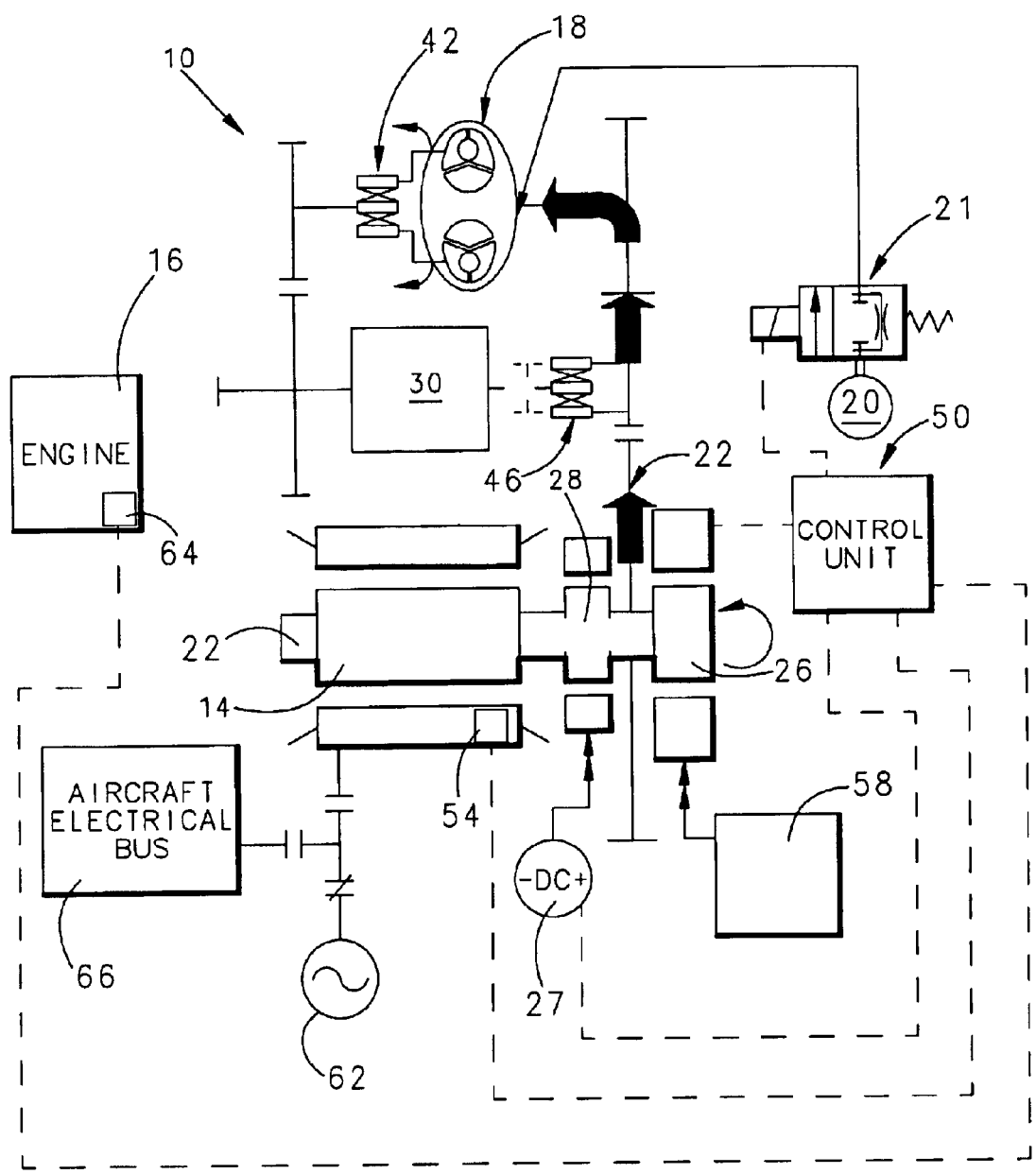
FIG. 1 illustrates a schematic representation of the invention, showing the flow of mechanical power as the support motor drives the dynamoelectric machine to a designated synchronous speed.

FIG. 1 illustrates a schematic representation of the inventive starter-generator 10. Like existing starter-generators, inventive starter-generator 10 employs dynamoelectric machine 14, which operates as both a motor and a generator. Dynamoelectric machine is a synchronous generator having rotor 22, which turns when the field windings of dynamoelectric machine 14 are charged by an alternating current from a power source. Support motor 26, such as a permanent magnet motor and generator, is mechanically linked to rotor 22 to accelerate it to a designated synchronous speed. Thus, as support motor 26 turns so too does rotor 22 of dynamoelectric machine 14.

Torque converter 18 may selectively couple and decouple the movement of rotor 22 to engine 16, such as a turbine engine for an aircraft. Torque converter 18 may be a hydraulic torque converter, which when filled with hydraulic fluid from hydraulic source 20 provides a coupling between rotor 22 and engine 16. As known, hydraulic source 20 includes a reservoir of hydraulic fluid that may pass to torque convert 18 through flow control valve 21. Then, rotor 22 drives engine 16 to turn. When hydraulic fluid is discharged from torque converter 18, rotor 22 is decoupled from engine 16. Accordingly, in this state, rotor 22 will not drive engine 16.

When torque converter is decoupled, dynamoelectric machine 14 may commence operation as a generator. Engine 16 is mechanically linked to constant speed transmission 30. As known, constant speed transmission 30, such as a constant speed drive unit, receives input from engine 16. Constant speed transmission unit 30 is also mechanically linked to rotor 22. Constant speed transmission 30 is such that varying input received from engine 16 results in a constant speed output to rotor 22 through known gearing techniques. Constant speed transmission 30 thus drives rotor 22 at a constant speed, creating a constant frequency output from dynamoelectric machine 14.

Couplings 42 and 46 permit the reduction of drag caused by components of starter-generator 10 during various modes of operation. Coupling 42 provides a mechanical link between torque converter 18 and engine 16 such that engine 16 is driven by torque converter 18 when filled with hydraulic fluid as long as the speed of torque converter 18 exceeds the speed of engine 16. However, once the speed of engine 16 exceeds the speed of torque converter 18, coupling 42 decouples engine from torque converter 18 by permitting engine 16 to overrun torque converter 18. For example, when engine 16 has reach a self-sustaining speed, it may overrun torque converter 18. Thus, coupling 42 limits torque converter 18 from creating a load on engine 16. Coupling 42 may be an overrunning clutch.

Coupling 46 provides a mechanical link between constant speed transmission 30 and rotor 22. The linkage is such that rotor 22 is coupled to the output of constant speed transmission 30 as long as the output speed of engine 16 exceeds the speed of torque converter 18. If the speed of rotor 22 exceeds the output speed of constant speed transmission 30, such as during start-up, then coupling 46 decouples constant speed transmission 30 from rotor 22, allowing rotor 22 to overrun constant speed transmission 30. In this way, constant speed transmission 30 does not load dynamoelectric machine 14 during start up. Coupling 46 may also be an overrunning clutch.

FIG. 1 illustrates the workings of these foregoing components at the initiation of start mode of engine 16. Specifically, power is supplied to support motor 26 by first power source 58, which may be an alternating current from a three phase inverter supplied to support motor 26. Support motor 26 may be a permanent magnet generator. Support motor 26 may be controlled by control unit 50 that oversees operation of support motor 26. A DC source 27 may supply power to exciter 28 to operate dynamoelectric machine 14. DC source 27 maybe integrated into control unit 50 or it may communicate with control unit 50 to oversee exciter 28. Support motor 26 turns rotor 22 of dynamoelectric machine 14, assisting its start up by accelerating dynamoelectric machine 14 to close to synchronous speed, say 400 Hz. This acceleration overcomes accessory and gear train drag. At a specific speed, such as 400 hertz, dynamoelectric machine 14 may then receive power from second power source 62, such as a three phase 115 volt alternating current power supply. Second power source 62 may operate at 400 hertz and then continue to drive dynamoelectric machine 14 as a synchronized motor at this speed. Control unit 50 may turnoff power to support motor 26.

Figure 2:
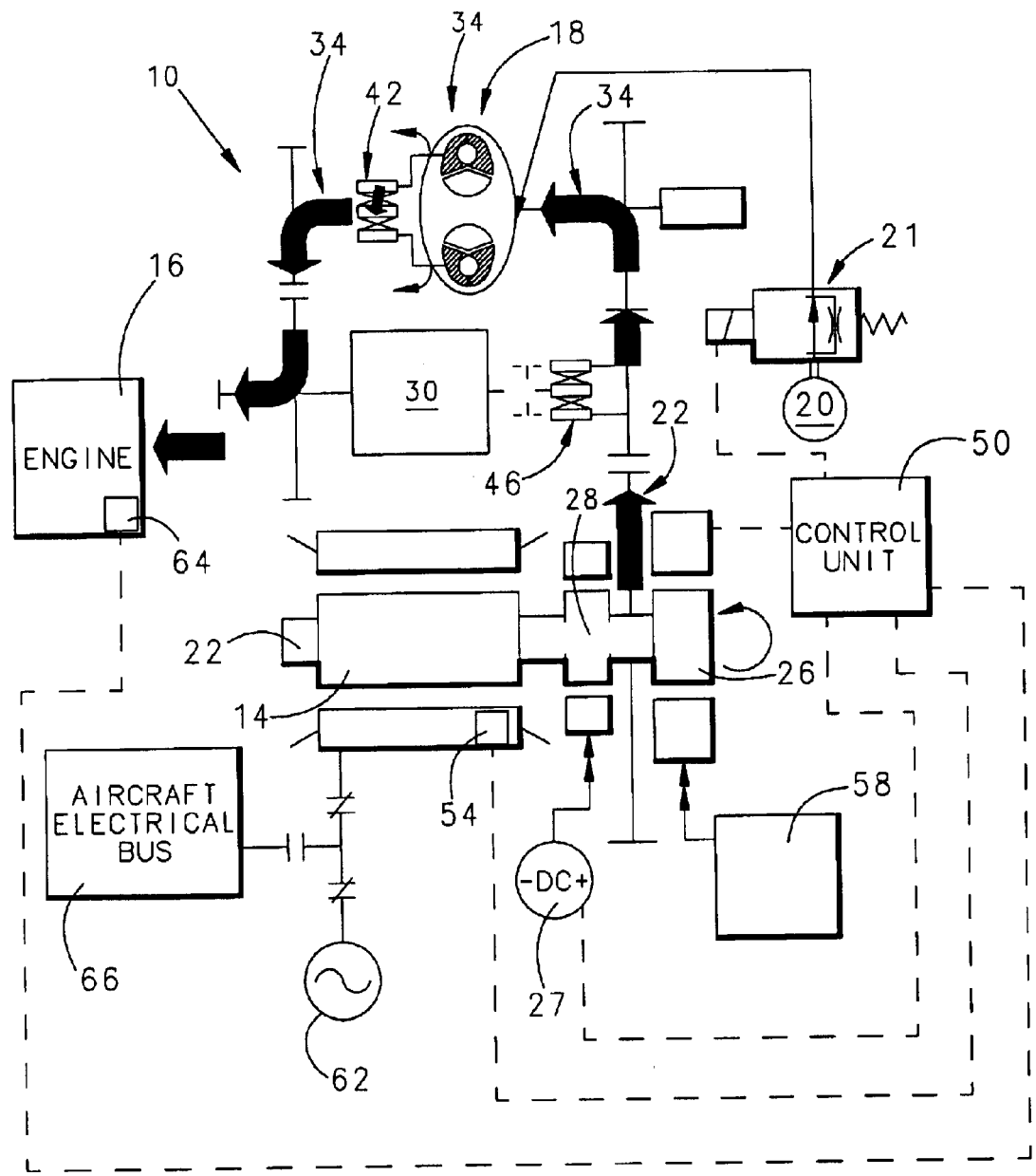
FIG. 2 illustrates a schematic representation of the invention, showing the flow of mechanical power in engine start mode.

As shown in FIG. 2, sensor 54 senses speed of dynamoelectric machine 14. Once dynamoelectric machine reaches a predetermined speed, say 400 hertz, control unit 50, which is in communication with sensor 54, then instructs flow control valve 21 to commence filling torque converter 18 with hydraulic fluid from hydraulic source 20. As hydraulic fluid begins to fill torque converter 18, torque converter 18 begins to rotate engine 16 through first coupling 42, creating power train 34. Once engine 16 reaches a self-sustaining speed, it will outpace the speed of torque converter 18. Coupling 42 permits this event to happen without significant drag on engine 16 as explained above by allowing engine 16 to overrun torque converter 18.

Engine sensor 64 senses when engine 16 has reached a self-sustaining speed. Engine sensor 64 may be part of engine 16 or it may be integrated into the input shaft of the starter drive generator. When such a condition is sensed, control unit 50 then discharges hydraulic fluid from torque converter 18 decoupling rotor 22 from engine 16. Hydraulic fluid is returned to hydraulic source 20.

Figure 3:
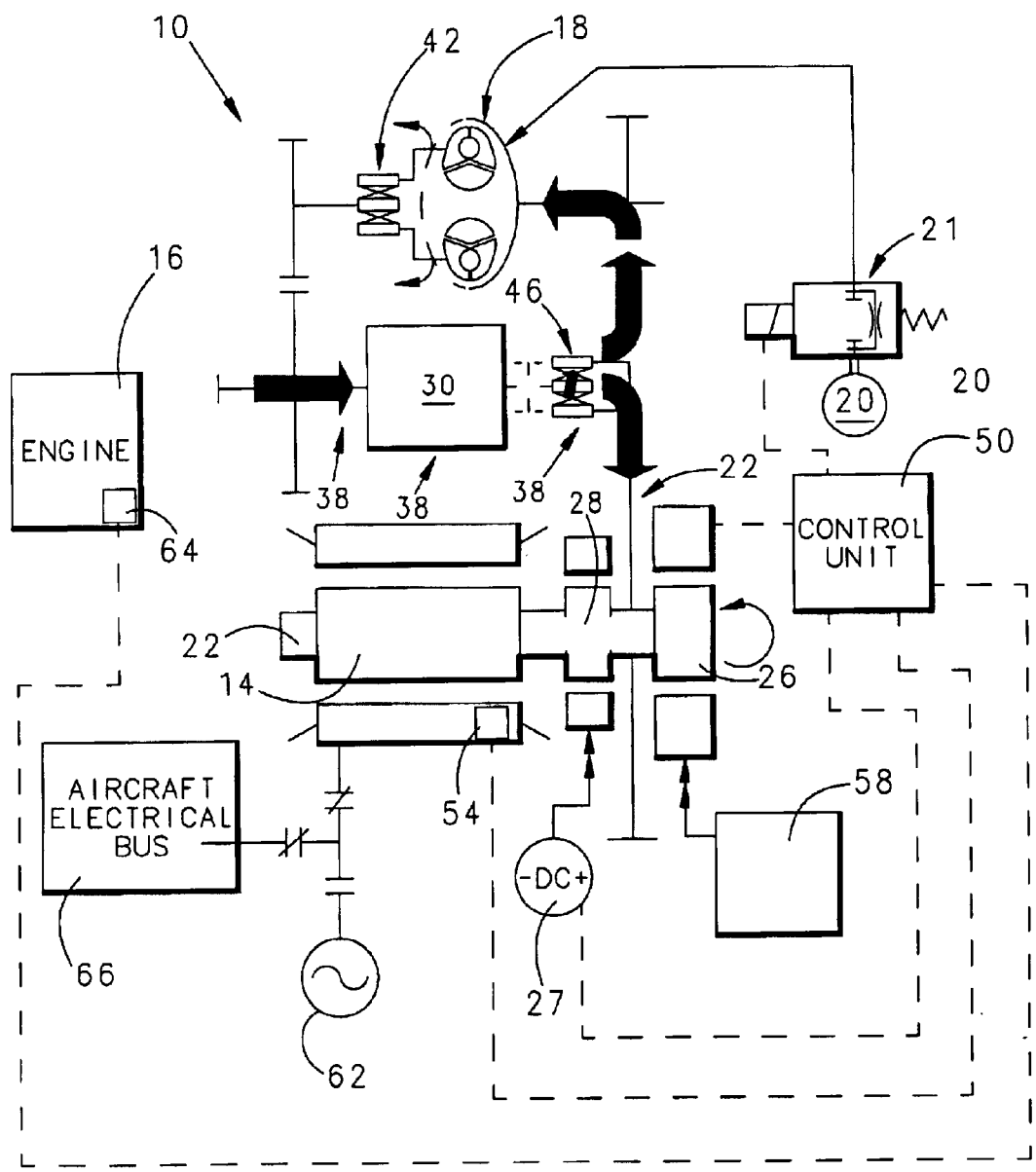
FIG. 3 illustrates the flow of mechanical power of the invention of FIGS. 1 and 2, showing the flow of mechanical power in power generation mode.

As shown in FIG. 3, engine 16 then serves to drive constant speed transmission 30, which itself turns second coupling 46 and drives rotor 22, creating power train 38. The engine 16 forms power train 38 with constant speed transmission 30, second coupling 46 and rotor 22 for a power generation mode of operation. Dynamoelectric machine 14 is thus driven to generate electric power at a constant frequency because of the constant speed of output from constant speed transmission 30 received by rotor 22. This power is then directed to aircraft electrical bus 66, which supplies alternating current electrical power to electrical components of the aircraft at frequency of constant speed transmission 30. Moreover, support motor 26, a permanent magnet generator, may also supply power to control circuitry due to its mechanical link with dynamoelectric machine 14. Such power may be passed through a voltage regulator of a general control unit of the aircraft. Power supplied to exciter 28 may be varied by the voltage regulator to control the output voltage. Notably, constant speed transmission may be integrated with dynamoelectric machine to form an Integrated Drive Generator as commercially available.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A starter-generator for an aircraft engine comprising;
   a dynamoelectric machine alternatively operable as a motor or as a generator, said dynamoelectric machine having a rotor;
   a torque converter for selectively coupling and decoupling said rotor to an engine, said torque converter coupling said rotor to the engine when said dynamoelectric machine is operated as a motor;
   a support motor coupled to said dynamoelectric machine for assisting in driving said dynamoelectric machine;
   a constant speed transmission having an input adapted to be connected to the engine and an output adapted to be connected to said rotor; and
   wherein the engine (a) may be started by said dynamoelectric machine when operated as a motor through a first power train including said torque converter and (b) may drive the dynamoelectric machine as a generator through a second power train including said constant speed transmission.

2. The starter-generator of claim 1 wherein said torque converter decouples said rotor from said engine until said dynamoelectric machine reaches a predetermined speed and couples said rotor to said engine after reaching said predetermined speed.

3. The starter-generator of claim 2 wherein said support motor assists said dynamoelectric machine in reaching said predetermined speed.

4. The starter-generator of claim 1 wherein said support motor comprises an permanent magnet motor.

5. The starter-generator of claim 4 wherein said permanent magnet motor comprises a generator.

6. The starter-generator of claim 1 including a control unit for controlling said torque converter.

7. The starter-generator of claim 1 including a first source of power for powering said support motor and a second source of power for powering said dynamoelectric machine wherein said second source of power powers said dynamoelectric machine when said dynamoelectric machine reaches a predetermined speed.

8. An aircraft engine comprising;
- a dynamoelectric machine alternatively operable as a motor or as a generator, said dynamoelectric machine having a rotor;
- a torque converter for selectively coupling and decoupling said rotor to an aircraft engine, said torque converter coupling said rotor to said engine when said dynamoelectric machine is operated as a motor;
- a support motor coupled to said dynamoelectric machine for assisting in driving said dynamoelectric machine when operated as a motor;
- a constant speed transmission having an input adapted to be connected to said engine and an output adapted to be connected to said rotor;
- a first coupling interconnecting said engine and said torque converter and operable to decouple said engine from said torque converter for engine speeds greater than the speed of said torque converter;
- a second coupling interconnecting said rotor and said output of said constant speed transmission and operable to decouple said rotor from said output for speeds of said rotor greater than the speed of said output;
- wherein said engine (a) may be started by said dynamoelectric machine, with assistance from said support motor, when operated as a motor through a first power train including said torque converter and said first coupling and (b) may drive the dynamoelectric machine as a generator through a second power train including said constant speed transmission and said second coupling, said torque converter for maintaining said rotor decoupled from said engine until said dynamoelectric machine reaches a predetermined speed, said support motor assisting said dynamoelectric machine in reaching said predetermined speed, and said torque converter coupling said rotor to said engine once a predetermined speed is reached.

9. The aircraft engine of claim 8 wherein said support motor comprises a permanent magnet motor.

10. The aircraft engine of claim 8 including a first source of power for powering said support motor and a second source of power for powering said dynamoelectric machine wherein said second source of power powers said dynamoelectric machine when said dynamoelectric machine reaches a predetermined speed.

11. The aircraft engine of claim 8 including a flow control valve for controlling a flow of hydraulic fluid from a hydraulic source to said torque converter.

12. The aircraft engine of claim 8 wherein at least one of said first coupling and said second coupling is an overrunning clutch.

13. The starter-generator of claim 1 wherein said torque converter has a hydraulically charged condition and a hydraulically discharged condition, said torque converter coupling said rotor to the engine when in said hydraulically charged condition and decoupling said rotor to the engine when in said hydraulically discharged condition.

14. The starter-generator of claim 13 wherein said torque converter is controlled by a control unit said control unit for selectively placing said torque converter in said hydraulically discharged condition and said hydraulically charged condition.

15. The start-generator of claim 14 including an engine sensor in communication with said control unit.

16. The starter-generator of claim 15 wherein said control unit controls said torque converter based on said engine speed sensor.

17. The starter-generator of claim 14 including a dynamoelectric machine sensor in communication with said control unit.

18. The starter-generator of claim 17 wherein said control unit controls said torque converter based on said dynamoelectric machine sensor.

19. The starter-generator of claim 7 including a control unit for controlling said first source of power and said second source of power.

* * * * *